UNITED STATES PATENT OFFICE.

MAX HARTMANN AND ERNST JACOBY, OF MUNICH, GERMANY.

PROCESS OF PRODUCING STABLE HYDROGEN-PEROXID COMPOUNDS.

1,063,679.  Specification of Letters Patent.   Patented June 3, 1913.

No Drawing.   Application filed January 27, 1913.  Serial No. 744,317.

*To all whom it may concern:*

Be it known that we, MAX HARTMANN and ERNST JACOBY, the first a citizen of Switzerland, the second a citizen of Germany, residing at Munich, Bavaria, Germany, have invented certain new and useful Improvements in Processes of Producing Stable Hydrogen-Peroxid Compounds, of which the following is a specification.

Our invention relates to hydrogen peroxid compounds, and has especial reference to a process of producing stable compounds of hydrogen peroxid and hexamethylentetramin, and to the product of said process.

It has been found that hexamethylentriperoxiddiamin, a peroxid-like combination, may be produced either by the action of ammonia on the product resulting from formaldehyde and hydrogen peroxid, or by dissolving ammonium sulfate at warm temperature in approximately 3% hydrogen peroxid solution and then adding thereto a 40% formaldehyde solution at approximately 55° C. The resulting product is highly explosive and barely soluble in water.

The present invention is based on the fact that hexamethylentetramin will combine with hydrogen peroxid to form crystallized double combinations which contain the hydrogen peroxid in stable form capable of indefinite preservation, these double combinations being easily soluble in water and not explosive. This result is astonishing in view of the fact that, ordinarily, hexamethylentetramin is very unstable in the presence of oxidizing media owing to the formaldehyde content of the hexamethylentetramin. Inasmuch as urea and other nitrogenous organic combinations with hydrogen peroxid produce crystallized double combinations, it is to be presumed that, in the present case, the combination of the hydrogen peroxid with the formaldehyde derivative also results through the medium of the nitrogen atoms of the hexamethylentetramin.

Our new product is of especial technical value as it combines two highly effective disinfectants in water soluble form. When the product is dissolved in water, hexamethylentetramin and hydrogen peroxid are obtained.

To produce the combination, finely pulverized hexamethylentetramin is introduced into cooled, high percentage hydrogen peroxid solution. By thorough stirring, rubbing, and the addition of a small quantity of a suitable organic solvent such as alcohol ether, the double combination precipitates out.

Following are examples of our new process:—

*a.* One kg. of very finely pulverized hexamethylentetramin is introduced into ½ kg. of 30% hydrogen peroxid solution, ice cooling being resorted to during the operation. After stirring the resulting fluid mass for a short time, ½ kg. of ether is added, and the mass is allowed to stand for a short time whereupon it sets hard. The ether and water are sucked off, and the mass is quickly dried *in vacuo* over sulfuric acid. In lieu of ether, we find that a mixture of equal parts of alcohol and ether is entirely satisfactory.

*b.* One kg. of concentrated ammonia solution with ½ kg. of polymeric formaldehyde are converted into hexamethylentetramin by being heated in a water bath, and after cooling, ½ kg. of 30% hydrogen peroxid solution is added; thereafter about one kg. of alcohol is added and then the combination is precipitated out by the use of approximately one kg. of ether.

The product is a white crystalline mass, easily soluble in water, barely soluble in cold alcohol, and insoluble in ether, chloroform and benzin. The product is not explosive and when heated in a platinum pan will burn with a bright flame. The watery solution reacts like a solution of hydrogen peroxid, and will, for example, liberate iodin from iodid of potassium. The combination, when dried, may be preserved for a long time.

It is probable that the combination produced by the above described process contains 1 molecule of hexamethylentetramin and 2 molecules of hydrogen peroxid, corresponding to fifteen percentum of active acid content. The content of active acid may be materially increased, according to the quantities subjected to reaction. After a time, the preparation evolves small quantities of ammonia and formaldehyde which accelerate the decomposition of the preparation, and it is, therefore, desirable to continuously remove these decomposition products. This may be effected by the addition of a small quantity of an acid anhydrid, as for example lactic-acid-anhydrid, glycolicacid-anhydrid or the acetyl combination of an aromatic oxyacid, for the absorption of the ammonia, and by the addition of a small quantity of an albumin combination or a polysaccharid, such as starch, for the absorption of the formaldehyde. Of the acetyl combination we may, for example, use acetyl-salicylic-acid. Aromatic acid anhydrids, for example, phthalic-acid-anhydrid, may also be employed.

The following examples are given, as being illustrative of the treatment of the preparation:—

1. One kg. of the quickly dried combination containing hydrogen peroxid and formaldehyde is admixed with 20 gr. of starch, 20 gr. of albumin and 60 gr. of crystallized, finely powdered lactic-acid-anhydrid. The product is a white, crystalline mass, which is easily soluble in water, barely soluble in cold alcohol, and insoluble in ether, chloroform and benzin. The product is not explosive, and when heated in a platinum pan burns with a bright flame. The aqueous solution reacts like a solution of hydrogen peroxid, and will for example, liberate iodin from iodid of potassium. When the combination is dried or in the above mixture, it may be preserved for a very long time.

2. One kg. of the dried product made according to the process first described is pulverized and then admixed with 20 gr. of starch and 20 gr. of acetyl salicylic-acid.

3. One kg. of the finely pulverized double combination produced by the process first described is admixed with 20 gr. of vegetable albumin and 20 gr. of phthalic-acid-anhydrid, and is then preserved in hermetically sealed glass containers.

What we claim is:—

1. The herein described process of producing stable hydrogen peroxid compounds, which process consists in introducing hexamethylentetramin into a hydrogen peroxid solution, and thereafter precipitating out the resulting double combination.

2. The herein described process of producing stable hydrogen peroxid compounds, which process consists in dissolving hexamethylentetramin in a hydrogen peroxid solution at low temperature, and thereafter precipitating out the resulting double combination, by means of a suitable organic solvent.

3. The herein described process of producing stable hydrogen peroxid compounds, which process consists in dissolving hexamethylentetramin in a hydrogen peroxid solution, thereafter precipitating out the resulting double combination, and finally adding to the double combination substances which are adapted to absorb the products of decomposition of said combination.

4. The herein described process of producing stable hydrogen peroxid compounds, which process consists in dissolving hexamethylentetramin in a hydrogen peroxid solution, thereafter precipitating out the resulting double combination, and finally adding to the said combination a small quantity of a substance adapted to absorb ammonia and a small quantity of a substance adapted to absorb formaldehyde.

5. The herein described process of producing stable hydrogen peroxid compounds, which process consists in dissolving hexamethylentetramin in a hydrogen peroxid solution, thereafter precipitating out the resulting double combination, and finally adding to said combination a small quantity of an acid anhydrid capable of absorbing ammonia and a small quantity of an albumin combination capable of absorbing formaldehyde.

6. As a new article of manufacture, a stable hydrogen peroxid compound containing hydrogen peroxid and hexamethylentetramin, substantially as described.

7. As a new article of manufacture a stable hydrogen peroxid compound containing hydrogen peroxid, hexamethylentetramin having mixed therewith a substance capable of absorbing ammonia, and a substance capable of absorbing formaldehyde.

In testimony whereof we affix our signatures in presence of two witnesses.

MAX HARTMANN.
ERNST JACOBY.

Witnesses as to Max Hartmann:
  A. V. W. COTTER,
  RICHARD LEMP.

Witnesses as to Ernst Jacoby:
  WOLDEMAR HAUPT,
  HAROLD B. QUARTON.